April 13, 1937.　　　C. W. KETTRON　　　2,076,650
HOUSE WIRING SYSTEM
Filed Aug. 7, 1935　　　4 Sheets-Sheet 1
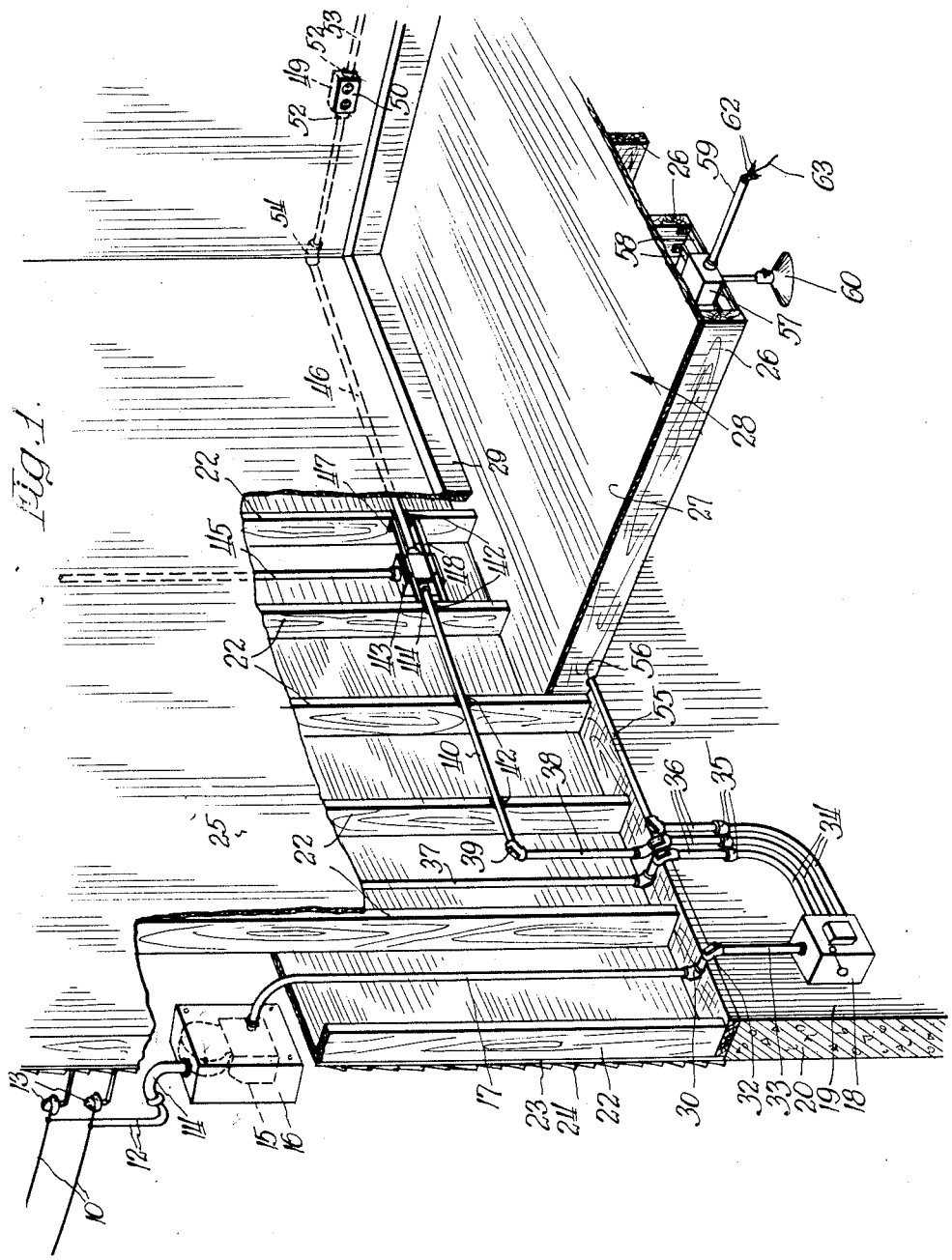
Inventor:
Charles W. Kettron

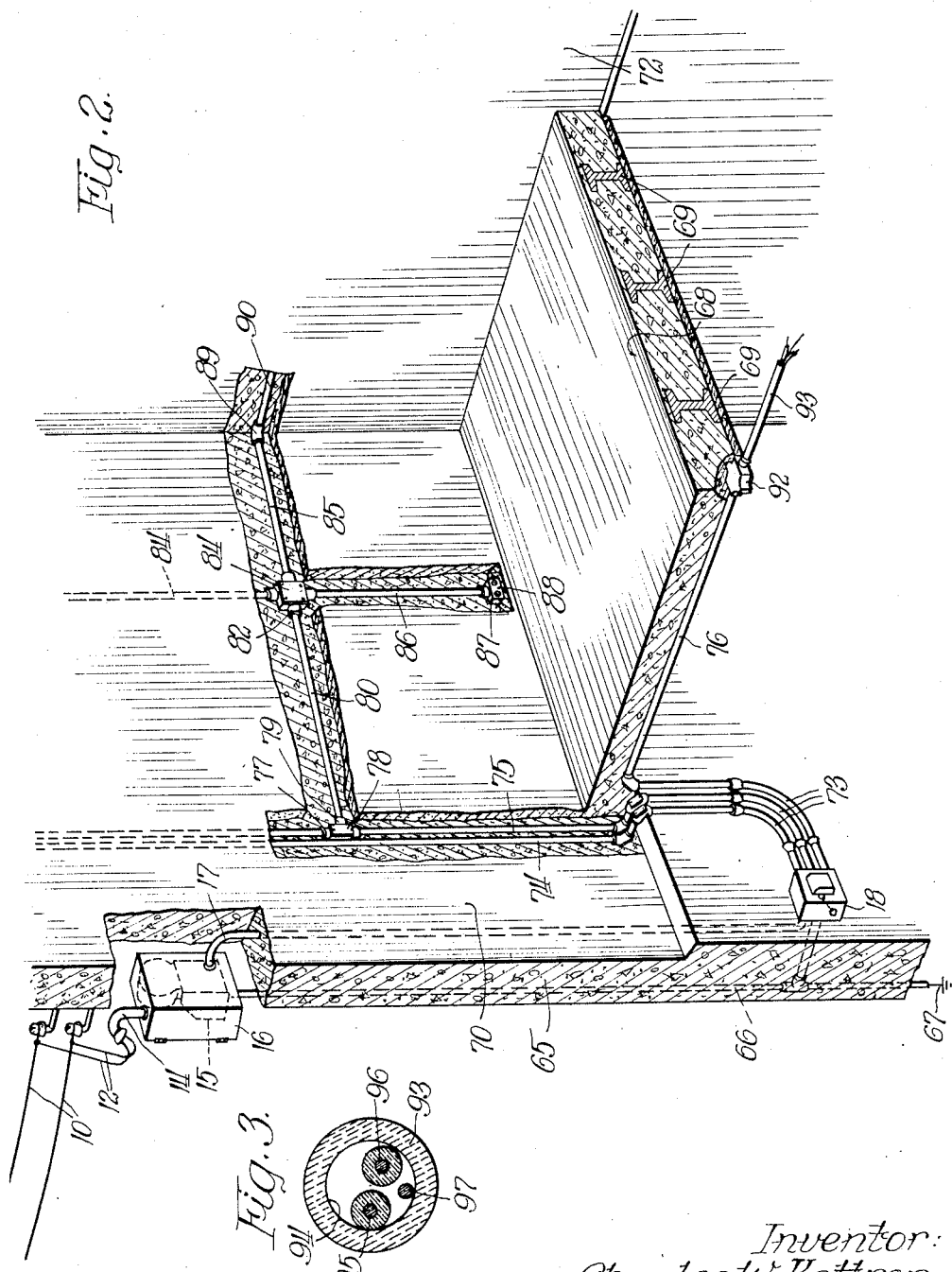

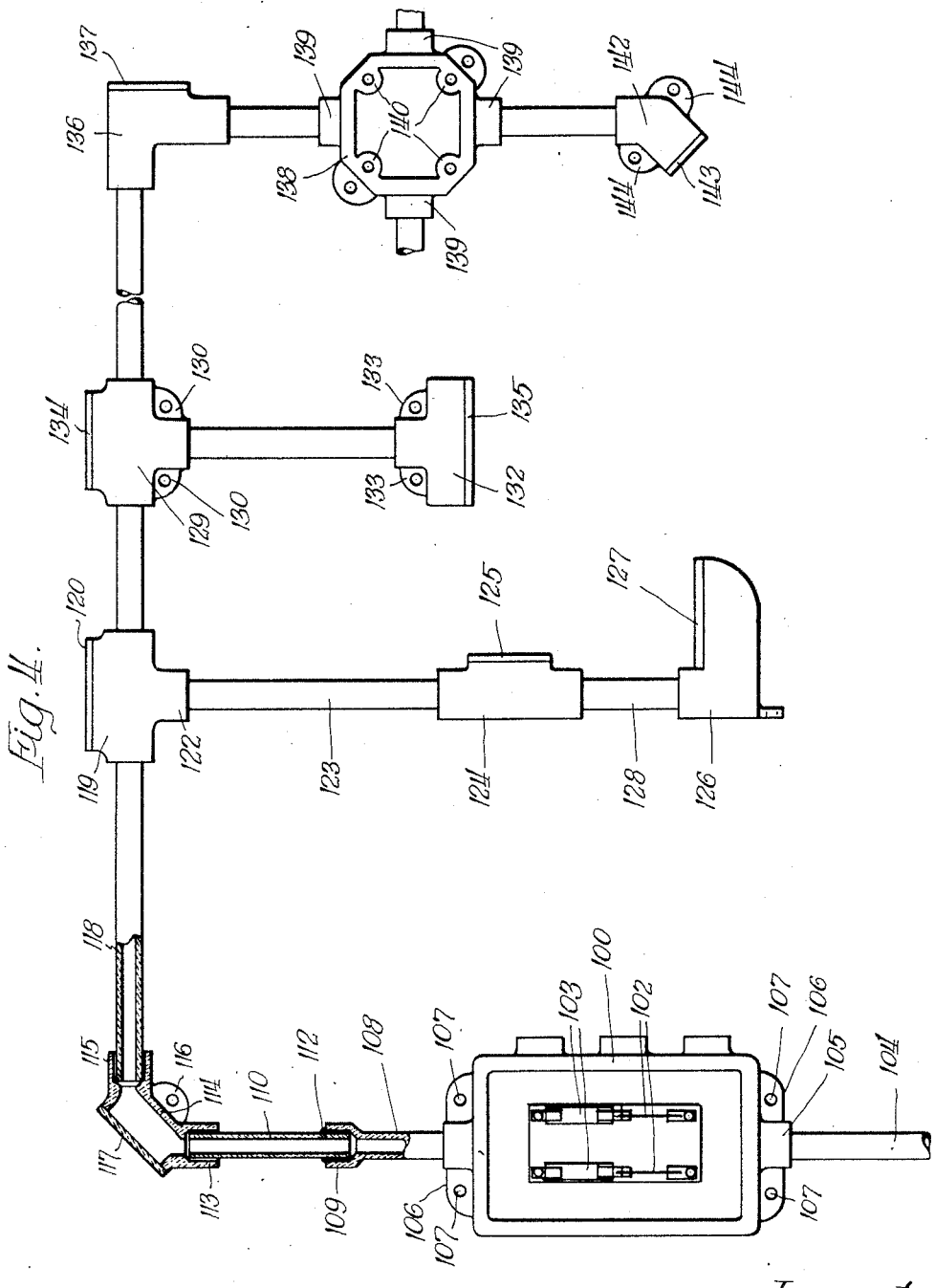

April 13, 1937.   C. W. KETTRON   2,076,650
HOUSE WIRING SYSTEM
Filed Aug. 7, 1935   4 Sheets-Sheet 4
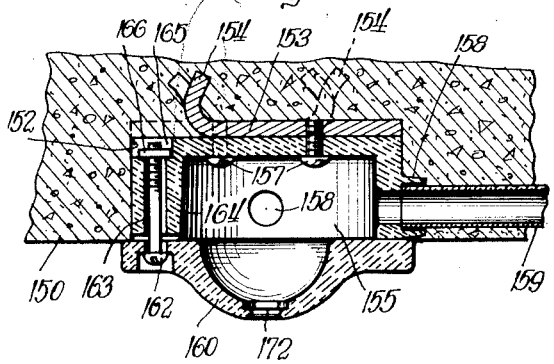
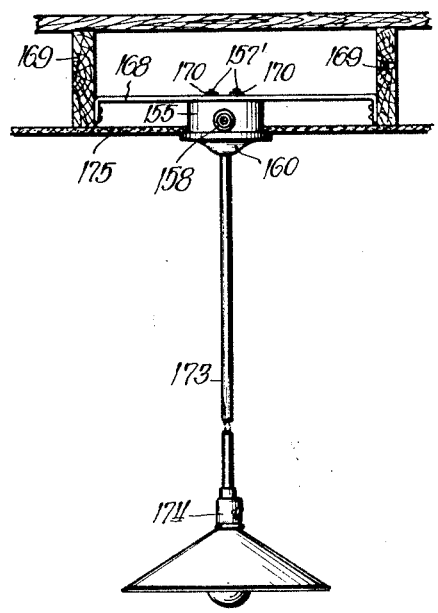
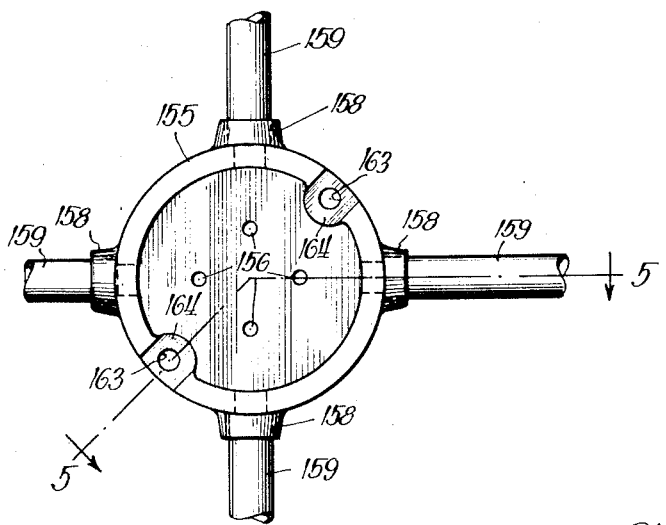
Inventor:
Charles W. Kettron

UNITED STATES PATENT OFFICE 2,076,650

HOUSE WIRING SYSTEM

Charles W. Kettron, Macomb, Ill., assignor to Illinois Electric Porcelain Company, Macomb, Ill., a corporation of Illinois Application August 7, 1935, Serial No. 35,024

9 Claims. (Cl. 247—3)

This invention is primarily concerned with house wiring systems for residences, office buildings, mercantile and manufacturing establishments, and other types of buildings.

It has been the practice for a number of years, in wiring such buildings for electrical service, to enclose the wiring in metallic conduits or the like, with metallic outlet boxes, switch boxes, and similar fittings. In a large number of cases the metallic conduits have themselves been employed as the ground return or the grounded neutral of wiring systems installed in this manner.

Serious objections to the use of such metallically enclosed wiring systems have been presented, such as the fact that the metal conduits are subject to rapid deterioration, especially in locations in which moisture is present, whereby rusting and eroding of the conduit takes place, as well as the fact that deterioration or abrasion of the insulation of the conductors carried within the conduit may result in direct contacting engagement between the conductor and the conduit, short-circuiting the system or resulting in leakage of current and consequent expense. If the conduit is employed as the ground for the system, rusting and corrosion of the conduit may result in destroying the continuity of the ground path, and consequently rendering such grounding inoperative. Also, fishing of the conductors through runs of metal conduit subjects the insulation of the conductors to abrasion over metallic edges, especially at pipe joints and elbows, where metallic projections or burls produce sharp cutting surfaces. Another objection is that shorting of one of the live conductors to the metallic conduit may result in passing a live current through the conduit, whereby occupants of buildings may be subjected to shocks caused by touching fittings, outlet boxes, appliances or the like, or may result in starting fire in the building.

The present invention, in its preferred embodiment, is directed to a wiring system in which the conduits are so formed as to retain all the advantages of metallic conduits of the type now in use, but at the same time eliminate substantially all of the objections which have heretofore been raised against the use of metallic conduits.

I propose to provide a wiring system for buildings and the like in which the conduits are formed of insulating material, preferably porcelain of the non-porous type, in which the entire conduit system, as well as the various fittings, outlets and connections form an electrically insulated, moisture-proof, enclosed and rigid wiring system. Glass of suitable strength and elasticity, such as boro-silicate glass, is contemplated within my invention.

One of the primary objects of the present invention is the provision of a conduit system comprising conduits and fittings from the entrance box to the outlets or termini of the various branch circuits to enclose the electrical wiring for the building, made entirely of porcelain or its equivalent. Such a system may be embedded directly in concrete without any danger of deterioration even though the concrete remains or becomes damp or is loaded with salts which would cause corrosion of iron conduit.

In connection with a three-wire electric wiring system, which can now be used in my present invention, I may employ a bare, uninsulated ground or neutral wire enclosed along with the live insulated conductors in the conduit system, or an insulated ground wire, as desired.

The present invention has as one of its chief advantages the provision of a rigid, substantially non-deteriorating, moisture-proof insulated enclosure which overcomes all dangers of rusting, erosion, short-circuiting or faulting between the wires and the conduit, and other inherent disadvantages of the metallic type of system.

Another object of the present invention is the provision of a rigid enclosed wiring system in which no threads are required at the fittings or connections, and no electrical bonding of the joints between various parts of the system is required, although all joints and fittings have sealed connections. This simplifies and facilitates rapid installation of such a wiring system.

A further object of the present invention is the provision of a rigidly enclosed wiring system having inherent flexibility of connection to accommodate the same to any desired wiring layout which may be required in a specified installation.

Another feature of the present invention is the provision of a conduit wiring system in which no metallic parts need be employed for either the conduits or the outlet fittings.

A still further object of the present invention is the provision of such a wiring system which is supported entirely on the framework of the building construction, regardless of the building construction, and eliminates any possible metallic connection between the various light fixtures, appliance outlets and the like.

Other objects and advantages of the invention will be more apparent from the following detailed description which, taken in conjunction with the accompanying drawings, will disclose to those skilled in the art the particular construction and operation of a preferred form of the present invention.

In the drawings:

Figure 1 is a perspective view, with portions thereof broken away, showing the installation of the wiring system of the present invention in a building of frame construction;

Figure 2 is a view corresponding to Figure 1, showing the installation of the wiring system of the present invention in a building of fire-proof or fire-resisting construction;

Figure 3 is a cross-sectional view through one of the conduits shown in Figure 2;

Figure 4 is a view, partly in section, showing diagrammatically a typical installation, with various fittings and the like;

Figure 5 is a sectional view through one form of outlet box installed in a concrete fire resisting construction, the section through the box being taken on line 5—5 of Figure 7;

Figure 6 is an elevational view of an outlet box and light fixture supported in a building of frame construction; and Figure 7 is a plan view of the outlet box with the cover removed.

Referring now in detail to Figure 1, the incoming lines for feeding electrical current from the power line to the building are indicated at 10 and are connected through the extensions 12, leading from the insulators 13 to the inlet 14 of a meter shown diagrammatically at 15, which meter is preferably housed in a suitable enclosure 16, which may be formed of porcelain, or any other suitable material. The outlet from the meter may preferably be taken from the rear wall thereof, and passes through the conduit 17 to the control switch and fuse box, (or what is commonly termed an entrance box), 18, disposed in the basement 19 of the building.

It has become a prevalent practice to mount the meter boxes of such a wiring system upon the outside of the building, whereby the wiring from the source of supply to the meter box is all disposed exterior to the building, and all connections into the building must be taken from the meter box. This not only prevents fraudulent by-passing of current, but also facilitates the inspection of the meter without entering the building.

The portion of the building shown in Figure 1 comprises a foundation 20, which may be of concrete, concrete block construction, or the like, upon which is mounted the frame studding 22, over which is nailed the sheathing 23 and clapboards or the like, indicated generally at 24. Obviously, this can be of any desired construction, and might be a building of the brick veneer type. Across the inner edges of the studding 22 there is provided the wall surface 25, which may comprise metal lath and plaster, wallboard, or any other suitable construction. The present invention is not concerned with the particular manner in which the building is constructed, and the construction shown is intended to be representative only of a wood frame building.

The floor construction shown in Figure 1 comprises the beams 26, extending laterally across the basement 19 at the ceiling thereof, and having on their upper surfaces flooring 27. The wall 25 of the room shown generally at 28 is provided with the usual type of baseboard 29, and it is to be understood that the floors, walls, and other portions of the building may be finished in any desired manner.

Considering now in more detail the wiring system itself, this system comprises the porcelain conduit 17, which is preferably, though not necessarily, cylindrical in cross-section, and is curved at its upper end to provide for an outwardly extending end portion suitably engaged with the meter casing 15 to provide for a moisture-proof coupling to the meter casing whereby the incoming conductors from the meter may be led through the interior of the conduit 17, through the elbows 30 and 32, to the vertically extending conduit 33 entering the top of the switch and fuse box 18. This provides for a rigid non-metallic insulating enclosure for the conductors leading from the meter to the switch box, and also provides for a moisture-proof sealed conduit, as will be described more in detail hereinafter. The conduit 17 and the box 18, being of a relatively fragile material not capable of self-support, may be supported on the structural framework of the building as by metal straps, lugs, or other means.

From the switch box 18 a plurality of branch conduits 34 are led outwardly, the conduits 34 terminating in bell-shaped end portions 35 which are adapted to receive the short connecting conduits 36. Each of the conduits 34 and the associated conduits 36 comprises an enclosed runway for one or more particular branch circuits of the house wiring system. One of the circuits is extended from the conduit 36 through suitable fittings into a vertically extending conduit 37 leading to the second or other floors of the building. A second circuit is extended from one of the conduits 34 into a vertically extending conduit 38, which at its upper end is provided with a fitting 39 leading to a horizontally extending conduit 40, suitably and rigidly supported in niched portions of the studding, as indicated at 42.

The circuit running through the conduit 40 enters a suitable junction box 43, preferably made of porcelain or other ceramic insulating material, the conduit 40 having its end sealed in an integral socket 44 formed in one side wall of the housing 43. From the housing 43, a circuit is extended through the conduits 45 and 46 to different portions of the building. The box 43 may be supported in position by means of a pair of brackets 47 and 48, bolted between the opposed lateral surfaces of the studding 22, and having means for securing the junction box 43 rigidly thereto for support on the studding. A compression clamp with adjustable supporting arms may embrace the box exteriorly. The arms are secured to the desired support.

The circuit extending through the conduit 46 is carried behind the wall surface 25, in suitable niches, for rigid support thereof, to an outlet box 49 having a base portion 50 disposed substantially flush with the surface of the wall 25. The outlet box 49 is provided with oppositely extending socket portions 52 receiving the end of the conduit 46 and an extension 53 of the conduit leading to another part of the building. A suitable fitting 54 is provided to facilitate bringing the circuit around the corner of the room 28.

Still another circuit is carried through one of the conduits 34 and the associated conduit 55, being rigidly supported, in one form of the invention, in niches 56 formed in the bottom edges of the beams 26, the conduit 55 having suitable connection to an outlet box 57 formed of porcelain or the like and rigidly supported by suitable brackets 58 between adjacent beams 26. From the outlet box 57 another conduit 59 may be provided for further outlets which may be desired along the ceiling of the basement 19, and suitable light fixtures, such as the fixture indicated generally at 60, may be provided at the various outlet boxes, such as the boxes 57, at any desired location in the system. As shown, the circuit extending through the various conduits 37, 40 and 56, preferably comprises a pair of insulated conductors 62, and a bare uninsulated conductor 63 carried therewith and forming the grounded neutral for a wiring system of the three-wire type.

In Figure 2 I show substantially the same construction, except that the wiring system is applied to a building of the fireproof or fire-resistant type.

The side wall of the building is indicated at 65, and the conduit 17 leading from the meter box 16 to the switch box or entrance box 18 is preferably embedded within the concrete, whereby it is held rigidly in position within the structural part of the building. The meter 15, as well as the entrance box 18, may be grounded through the metallic pipe 66 which is connected to ground at 67, as sometimes required by code or ordinance.

The floor slab 68 of the building is supported by suitable metal I-beam members 69 embedded within the concrete forming the floor structure. The side walls of the building are indicated at 70 and 72, and are preferably formed of concrete. If desired, hollow tile floor arches or similar equivalent constructions may be employed as desired, without departing from the present invention.

The wiring system comprises a plurality of porcelain conduits 73 leading from the entrance box 18, and passing through suitable connections to the vertically extending conduit 74, the parallel branch conduit 75, and the horizontally extending conduit 76 embedded for rigid support within the under surface of the floor slab at 68 intermediate a pair of the supporting girders 69. The conduit 75 is provided with a T-connection 77, having a removable cover plate at 78 which will be described in more detail hereinafter, and is provided with a normally extending socket portion 79 receiving one end of a horizontally extending conduit 80 embedded within the wall 70. It will be noted that both the conduits 74 and 75 are embedded within the wall surface, being thereby rigidly held in position. In fact, the entire wiring system finds rigid support in the structure of the building.

The other end of the conduit 80 extends into the projecting sleeve 82 of a junction box 83 formed of porcelain or the like, which has the extending conduits 84, 85 and 86 extending therefrom, carrying branch circuits connecting with the circuit extending through the conduits 75 and 80.

The conduit 86 terminates at its lower end in an outlet box 87, having the face plate 88 substantially flush with the inner surface of the wall 70. The conduit 85 is adapted to be led about the corner of the room by means of the fitting 89, and then continues through the conduit 90 to any suitable location. It is to be noted that the conduits are all placed rearwardly of the inner surface of the wall, and are held in rigid fixed position by means of the concrete or other medium in which they are embedded.

The conduit 76 is extended along the under surface of the floor slab 68 to a junction box 92, preferably formed of porcelain or the like, from which a second conduit 93 may be extended, if desired, to carry the circuit to any other desired point.

As shown in Figure 3, the conduit 93 is provided with the central passageway 94, which is adapted to enclose the insulated conductors 95 and 96 as carrying the circuit to the various outlet boxes and lighting fixtures. An uninsulated conductor 97 is also carried within the opening 94 in the conduit, and serves as the grounded neutral or return for a three-wire system which may be employed in the present invention. Obviously, the same type of circuit may be carried in any of the conduits shown in Figures 1 and 2.

Referring now in detail to Figure 4, which shows a somewhat schematic layout of the wiring system, in which the various component parts correspond to those shown in Figures 1 and 2, but in enlarged detail in order to illustrate their particular construction, I provide a typical entrance box 100, which includes the fuses 102 and the switch member 103 for controlling the various circuits leading from the box. The incoming conductors to the box are led thereinto through the conduit 104, which is suitably engaged within the cylindrical socket portion 105 projecting outwardly from the end wall of the box. The box 100 is provided with extending lug portions 106 at opposite ends thereof, provided with suitable openings 107 for receiving suitable means for securing the same to a supporting wall or other part of the structural framework of the building.

The box 100, as well as the conduit 104, are formed of porcelain, in a preferred embodiment of the invention, which porcelain preferably comprises a vitreous, non-absorbent and non-porous material having extremely high dielectric properties and forming an ideal material for an insulated system of this type. The box 100, as well as various other of the fittings, is preferably made by casting of wet process porcelain. However, the tubular conduit 104 is preferably made, in a preferred form of my invention, by extruding wet process porcelain in any desired length. Obviously, curves of various radii may be made up for selective use, such as shown in the incoming conduits 17 of Figures 1 and 2.

Extending outwardly from the opposite end of the entrance box 100 is a length of conduit 108, provided with a flared end or socket portion 109, which may be formed from the extrusion of wet process porcelain by first opening the die to make the flange, then closing the die to extrude the tube at the proper diameter.

Extending into the socket or flange 109 is another length of conduit 110, and between the outer surface of the lower end of the conduit 110 and the inner surface of the socket 109 I preferably provide a binder or sealing means, which may comprise pitch, asphalt, oakum, or other suitable non-conducting sealing or caulking material that can be flowed or forced into this joint, as indicated at 112. The upper end of the conduit 110 is adapted to fit within the flanged portion 113 of an elbow or secondary junction box 114, which box is provided with a second socket or flange 115 extending substantially normal to the axis of the flange 113. This member 114 is preferably formed by casting of wet process porcelain. It is provided with a lug portion 116 having a suitable opening receiving means for securing the same to a supporting member, or it may be clamped in exterior of the same, if desired. The fitting 114 is provided with a removable cover 117 extending diagonally between the sockets 113 and 115, which cover may be removed during the fishing of wires through the adjoining conduit, so that the wires or conductors need not be drawn around the corners within the fitting. The cover 117 may be suitably secured onto the fitting 114 by means of screws or the like, or may be cemented thereto.

The conduit 118, which extends into the socket 115 of the member 114, as well as the upper end of the conduit 110, which extends into the socket 113, may be coated with a suitable sealing material or the like for providing a moisture-proof seal between the conduit and the fitting 114, in order to exclude moisture from the interior of the conduit and the interior of the fitting.

The present invention also contemplates the provision of T-shaped junction boxes 119, formed in the same manner as the boxes 100 and 114, and provided with removable covers 120 through which the wires may be readily fished. The junction box 119 is also provided with an extending socket portion 122 receiving the length of conduit 123 leading to a wall outlet box 124 having the wall outlet facing plate 125, and also to a floor socket box 126, having the facing plate 127 lying flush with the floor. These boxes 119, 124 and 126 may be made by casting wet process porcelain or the like, and the extension conduits 123 and 128 therebetween are suitably sealed into the sockets formed integral with the boxes. The face plates 125 and 127, as well as the removable covers 120, may be made of metallic material or of insulation, such as "bakelite" or the like, capable of taking a pleasing decorative surface, and may be secured to the boxes in any desired manner.

I also provide a fitting such as shown at 129 for an installation of this type, which is similar to the fitting 119 except for the formation of the integral lugs 130 whereby the same may be secured to a supporting surface. A suitable junction or outlet box 132 may also be provided with lugs 133 for securing the same in fixed position on a support, both the boxes 129 and 132 being provided with removable cover plates 134 and 135, respectively.

An angle fitting or elbow 136 is provided for making right angle turns, and is provided with a removable cover 137 whereby the wire may be readily fished therethrough without drawing the same about sharp corners or the like. It is also within the purview of the present invention to provide junction boxes such as shown at 138, having a plurality of outlets 139 for leading branch circuits in various directions from the box, and being provided with integral boss portions 140 suitably tapped to receive the screws for securing a cover plate thereto. If it is desired to make an angular turn of an angle greater than a right angle, the angle box 142 may be employed, having the removable closure plate 143 suitably secured thereto, and provided with lugs 144 for supporting the same in position.

In Figure 5 is shown the manner in which an outlet box may be mounted for support in a building of concrete or fire-proof construction. The concrete floor slab, wall or ceiling is shown at 150, and is recessed, as at 152, to receive a plate 153 having extending fingers 154 embedded in the concrete. Disposed in the recess 152 and keyed along its external surface into the concrete is an outlet box 155, preferably formed by the wet cast process and left unglazed. The box 155 is provided with openings 156 in its bottom wall, as shown in Figure 7, which are adapted to receive screws 157 for securing the box to the supporting plate 153.

The box 155 is provided, in its lateral wall, with a plurality of radially extending sockets 158, having enlarged recessed portions for receiving the ends of the porcelain conduits 159 carrying the conductors into the outlet box.

The outlet box 155 is provided with a cover 160, which has oppositely disposed recessed sockets adjacent its edge receiving the bolts 162 extending through the openings 163 formed in the oppositely disposed bosses 164. The bottom of the box 155 is recessed at 165 to provide a polygonal socket receiving the nut 166 threading onto the end of the bolt 162 to clamp the cover in fixed position over the outlet box. The nut 166 may be cemented in the recess. Also, instead of a separate nut the supporting plate 153 may have a threaded hole in line with the bolt 162.

As shown in more detail in Figure 6, the box 155 may be readily supported in a frame building, in which case metal straps 168 are extended between the rafters 169 and the bolts 157' are clamped thereto by the nuts 170.

The cover 160 of the box is provided with a central opening 172, as shown in Figure 5, through which a supporting and connecting means 173 is extended as shown in Figure 6, to support a light fixture 174, thus supporting the light fixture in pendant position below the ceiling 175. Obviously any desired manner of support for the box in the wall 150 or in the rafters or studding 169 may be provided within the scope of the present invention.

It is to be understood that the various junction boxes and fittings may be provided with ears for receiving screws or the like, or they may be provided with projections for embedding the same in concrete, or they may be otherwise supported on the metal lath, studding, or other structural parts of the building, or embedded in the concrete. If used in a wooden frame building they may be mounted on the wooden frame in any well known manner, as by metal straps or the like.

I propose to make the tubular conduit out of extruded porcelain of wet process type of clay, which is preferably glazed exteriorly. The interior surface may, optionally, be glazed and thereby rendered very smooth, facilitating the drawing or fishing of wires therethrough. Glazing is not necessary where wet process clay is used. Also, by providing suitable sealing or caulking material at the various junctions of the fittings and the conduits, I provide for a fully enclosed and sealed wiring system which is non-conducting, free of metallic internal surfaces, optionally provided with a glazed surface facilitating the drawing of conductors therethrough, and having a relatively high dielectric strength. In addition, the sealing provides for excluding moisture or water from the interior of the conduit, and since the conduit and junction boxes, being formed of such material, are not subject to deterioration or erosion due to the action of moisture or the chemical constituents present in the structural parts of a building, it is obvious that no rusting, erosion or deterioration of such a wiring system is present in my proposed type of installation.

It is therefore believed apparent that I have provided a wiring system for buildings or the like which is capable of retaining many of the advantages of the metallic conduit systems previously employed, while eliminating the chief disadvantages and objections arising in connection with the former types of systems. In addition, the present system complies fully with the objects of municipal ordinances and codes regulating the manner in which wiring systems are to be installed in buildings, and produces a safe, efficient and easily assembled type of installation.

In case a series alternating current circuit is to be employed in a building, the system of conduit of my invention is highly advantageous in eliminating the inductance of iron conduit along with the conductive character of the usual iron conduit.

The switch and fuse box may be made of metal, and may be directly grounded to the ground wire or to a grounded fixture.

The incoming wires from the transformer, not shown, may comprise single phase or three phase conductors. Generally, single phase current is distributed throughout the building and one wire of each single phase pair is grounded both at the transformer and at the meter of the user. According to my invention, the conduit being ungrounded, i. e., being of insulation, introduces no hazards where joints in the wires are made. Also, the conduit of my invention is fire-proof, both because it is incombustible and because it is slow to conduct heat.

Where special three conductor fittings, such as are employed for grounded neutral neon sign transformers, are desired, they may be provided by carrying a ground wire through the conduit to the desired outlet. This avoids possibility of a careless or ignorant workman employing the conduit for a ground return.

I do not intend to be limited to the particular manner of arrangement of the wiring system, nor to the particular type of fittings and connections which have been shown, since the underlying principles of the present invention are based upon the concept of enclosing all of the wires for a house or building in porcelain, or other equivalent insulating containers. The invention herein disclosed is therefore to be construed only as limited by the prior art within the scope and spirit of the appended claims.

I claim:

1. In a building having a structural framework, a meter supported externally of said building, means for extending an electric circuit to said meter, and an electric wiring system for extending branch circuits to desired portions of said building and rigidly supported entirely on said framework of said building, comprising a moisture-proof sealed conduit system extending from said meter through said building and formed entirely of porcelain conduits and fittings having sealed connections therebetween, said system including a conduit extending from the building side of said meter through the wall of said building to a porcelain entrance box containing switch means and fuses for said branch circuits, and conduits extending from said box to said desired portions of said building through the walls, floors and ceilings thereof and rigidly supported therein, said conduits including porcelain junction boxes and outlet fittings, all connected by sealed joints therebetween and corner fittings and T connections formed of porcelain, and conductor means within said system for extending electrical circuits therethrough.

2. In a cast concrete building structure having a conduit system for electric power and light, the combination with the concrete walls of the building of a porcelain conduit embedded within the concrete and having outlets to the surfaces of the walls for the introduction of electric wires and for the connection of electrically operated devices, branches of said conduit leading to a common inlet for electric conductors, and insulated electric conductors from said inlet to said outlets for the distribution of electric current throughout the structure, said conduit between its inlet and its outlets being substantially impervious to the entry of moisture to the interior thereof and being free of conducting parts in contact with the wires which could cause grounding of a conductor in case of any failure of the insulation of the wire.

3. In a building structure having a conduit system for electric power and light comprising porcelain conduits interiorly glazed receiving conductors for said system, said conduits being entirely supported on the framework of the building and having sealed connections to fittings in said system, an outlet fitting comprising a cup-shaped porcelain box having a laterally projecting socket for receiving one of said porcelain conduits, means between said socket and said conduit sealing the conduit in said socket, an anchoring member rigidly secured in the framework of said building, means projecting through the base of said box for securing the same rigidly to said member, a porcelain cover for said box having an outlet for supporting an electrical fitting, and means securing said cover to said box and entirely insulated by said cover and box from the interior of said box.

4. In a cast concrete building structure having a conduit system for electric power and light comprising porcelain conduits interiorly glazed receiving conductors for said system, said conduits being entirely embedded in the concrete of the structure and having porcelain outlets extending to the surface of the walls of said structure and sealed to said conduits, an outlet fitting comprising a cup-shaped porcelain box having a laterally projecting socket for receiving one of said porcelain conduits, means between said socket and said conduit sealing the conduit in said socket, an anchoring member rigidly embedded in the concrete of said structure, means projecting through the base of said box for securing the same rigidly to said member, a porcelain cover for said box having an outlet for supporting an electrical fitting, and means securing said cover to said box and entirely insulated by said cover and box from the interior of said box.

5. An electrical power and light distribution system for a building structure comprising a conduit system consisting entirely of porcelain conduits, outlet fittings, and interconnecting fittings between said conduits formed entirely of porcelain and rigidly supported on the framework of said building, all of said fittings having one or more projecting sockets of an internal diameter slightly greater than the external diameter of said conduits for receiving the adjacent ends of said conduits to complete the system, and insulating cementitious sealing material between said conduits and said sockets rendering the connection therebetween rigid and moisture-proof.

6. An electric wiring system for buildings, comprising continuous conduit and outlet elements, said elements being primarily adapted for concealed installation during construction of the building and formed of highly refractory nonpassage of moisture and forming an efficient insulation against short circuits.

7. An electric wiring system for buildings, comprising continuous conduit and outlet elements, said elements being primarily adapted for concealed installation during construction of the building, and formed of porcelain.

8. An electric wiring system for buildings constructed in part of concrete, plaster and the like, comprising continuous conduit and outlet elements, said elements being primarily adapted for concealed installation in the concrete, plaster and the like during the construction of the building and formed of highly refractory, non-metallic, non-corrosive material resistant to the passage of moisture and forming an efficient insulation against short circuits, said elements having a rough outer surface to permit adherence of the concrete, plaster and the like thereto.

9. An electric wiring system for buildings constructed in part of concrete, plaster and the like, comprising continuous conduit and outlet elements, said elements being primarily adapted to be embedded in the concrete, plaster and the like during construction of the building, and formed of porcelain, said elements having a rough outer surface to permit adherence of the concrete, plaster and the like thereto.

CHARLES W. KETTRON.